United States Patent [19]
Alten

[11] Patent Number: 5,174,075
[45] Date of Patent: Dec. 29, 1992

[54] DEFORMABLE SEALING DEVICE FOR A GAP BETWEEN A WALL OPENING OF A BUILDING WALL AND A BACK WALL OF A VEHICLE

[76] Inventor: Kurt Alten, Ringstr. 14, D-3015 Wennigsen, Fed. Rep. of Germany

[21] Appl. No.: 766,552

[22] Filed: Sep. 25, 1991

[30] Foreign Application Priority Data

Sep. 25, 1990 [DE] Fed. Rep. of Germany ....... 4030266

[51] Int. Cl.⁵ .................... E04H 14/00; E01D 1/00
[52] U.S. Cl. ................... 52/173 DS; 14/71.5
[58] Field of Search ............... 52/2.12; 49/123, 303, 49/316, 477, 483; 14/71.5

[56] References Cited

U.S. PATENT DOCUMENTS

| | | | |
|---|---|---|---|
| 4,359,846 | 11/1982 | Votteler | 14/71.5 X |
| 4,495,737 | 1/1985 | Alten | 52/173 DS |
| 4,516,366 | 5/1985 | Alten | 52/173 DS |

FOREIGN PATENT DOCUMENTS 7708639 9/1977 Fed. Rep. of Germany .
3631591 9/1986 Fed. Rep. of Germany .

Primary Examiner—David A. Scherbel
Assistant Examiner—Beth A. Aubrey
Attorney, Agent, or Firm—Robert W. Becker & Associates

[57] ABSTRACT

A deformable sealing device for a gap between a wall opening of a building wall and a back wall of a vehicle docking at the wall opening is provided. The sealing device comprises a flappy deformable skirt comprising an upper transverse portion, that is suspended at an upper edge thereof from a transverse support, and two deformable vertical strips that are arranged parallel to vertical sides of the wall opening and are supported at respective elastically deformable support bodies. A top cover extends from the transverse support to the building wall. The top cover has extensions in a longitudinal direction thereof that are freely suspended from ends of the top cover and cover upper, outwardly oriented portions of the support bodies. The extensions are provided with a weight at a free end thereof.

4 Claims, 2 Drawing Sheets

DEFORMABLE SEALING DEVICE FOR A GAP BETWEEN A WALL OPENING OF A BUILDING WALL AND A BACK WALL OF A VEHICLE

BACKGROUND OF THE INVENTION

The present invention relates to a deformable sealing device for a gap between a wall opening of a building wall and a back wall of a vehicle docking at the wall opening, whereby the sealing device comprises a flappy deformable skirt comprising an upper transverse portion, that is suspended at an upper edge thereof from a transverse support, and two deformable vertical strips that are arranged parallel to vertical sides of the wall opening and are supported at respective elastically deformable support bodies. A top cover extends from the transverse support to the building wall whereby the cover has extensions in a longitudinal direction thereof that are freely suspended from ends of the top cover and cover upper portions of the support bodies.

The extensions forming an overhang at both sides of the top cover are usually provided to cover the gap between the top cover on the one hand and the support bodies arranged at the vertical sides of the wall opening for the vertical strips respectively the laterally arranged outer cover or tarpaulins of the support bodies. It has been known to freely suspend the extensions, however, due to weather conditions, problems may arise when relative movements between the top cover and the outer covers respectively support bodies occur or are desired to occur. In these cases undesirable changes of the position of the extensions may occur, for example, due to strong winds.

It is therefore an object of the present invention to prevent these disadvantages and to provide means that will maintain the freely suspended extensions of the top cover in their prescribed position when between the extension and the vertical side portions of the sealing device relative movements occur, for example, when the upper transverse portion of the sealing device together with the top cover and its extension are lifted and then lowered.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The sealing device of the present invention is primarily characterized by the extensions being provided with a weight at a free end thereof. Preferably, the free ends of the extensions are provided with a loop for receiving a rod, whereby the rod may be made of steel.

Thus, it is only required to provide the ends of the extensions with a weight in the form of the aforementioned rods in order to prevent the aforementioned problems concerning the undesirable change of position of the extensions. The loops may be produced by doubling the fabric at the ends of the extension whereby the loop is then fixed in position by connecting the two fabric portions by a seam or similar means.

Preferably, the transverse support together with the top cover, the upper transverse portion and the extensions are liftable. It is important that the length of the extensions is greater than the lifting distance.

In another embodiment, the transverse support together with the top cover, the upper transverse portion and the extensions may be pivotable about a horizontal axis that is located adjacent to the building wall. Preferably, guide rods that engage the transverse support are provided for pivoting the transverse support and the connected components (the top cover, the upper transverse portion and the extensions). The length of the extensions should be greater than the pivoting distance.

DESCRIPTION OF PREFERRED EMBODIMENTS

Figure 1:
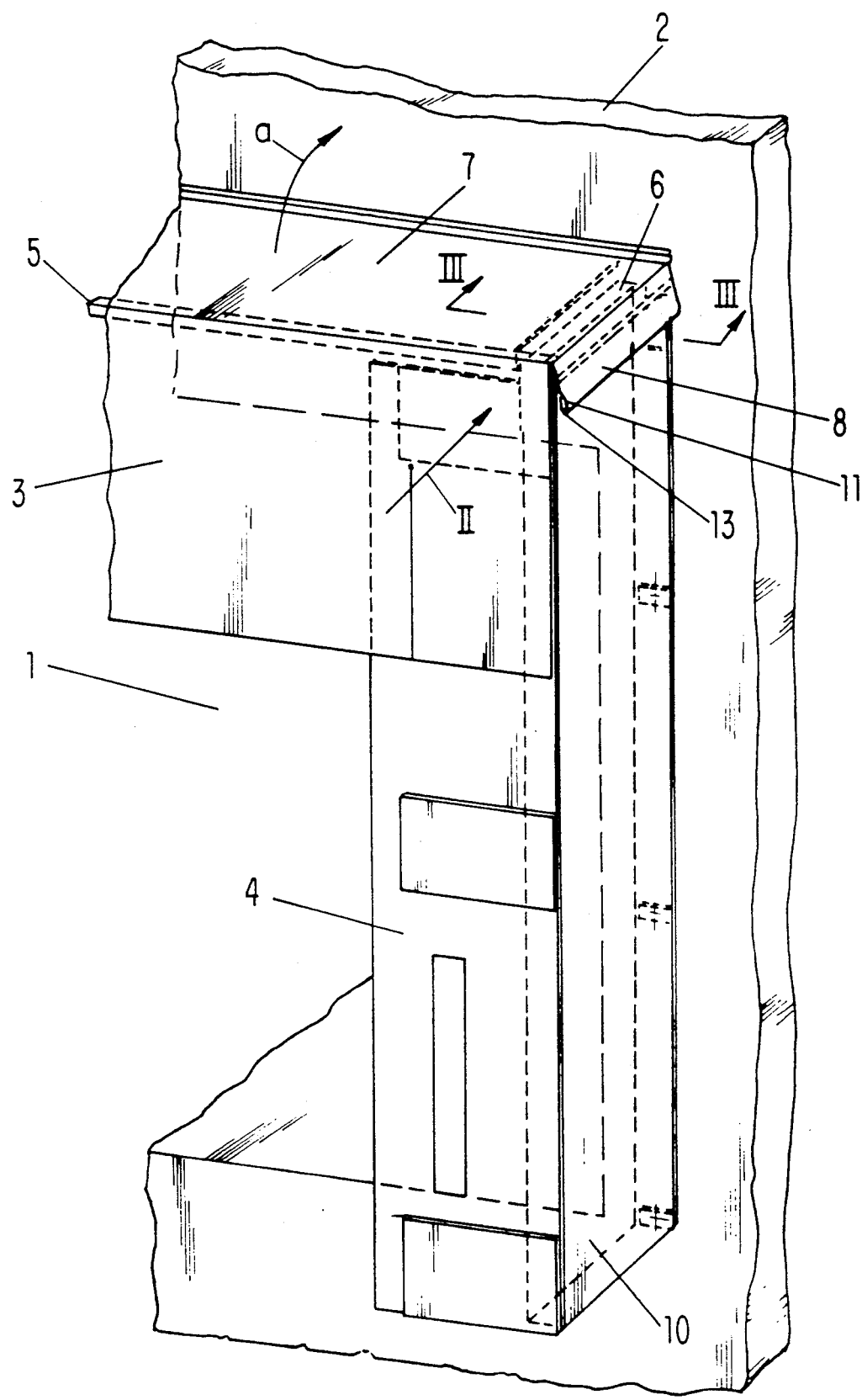
FIG. 1 shows the right half of a deformable sealing device positioned at the edge of a wall opening in a perspective view.
Figure 2:
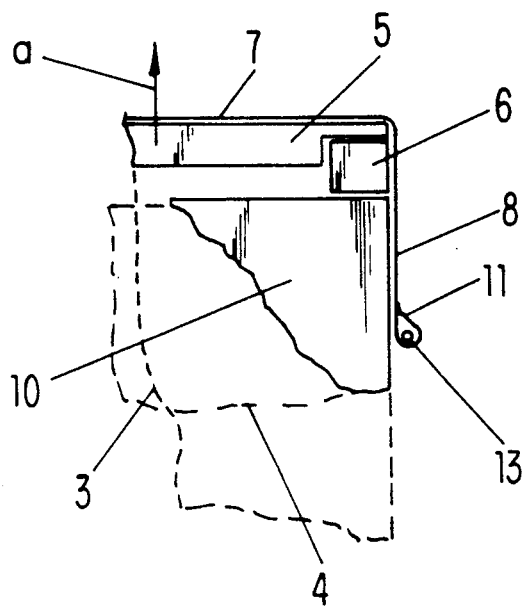
FIG. 2 shows a partial view in the direction of arrow II according to FIG. 1.
Figure 3:
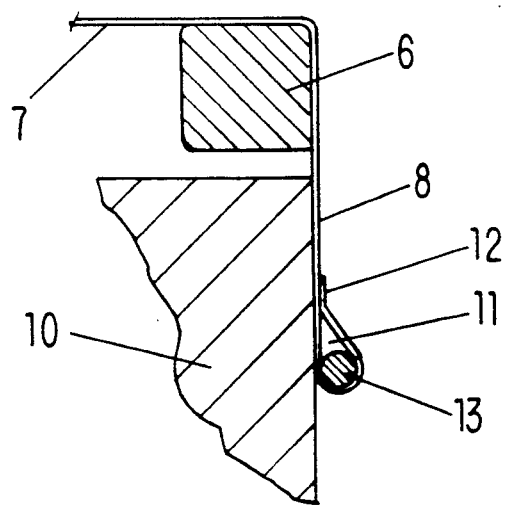
FIG. 3 shows a partial cross-sectional view along the line III—III of FIG. 1.

The present invention will now be described in detail with the aid of several specific embodiments utilizing FIGS. 1 through 3.

The wall opening 1 of the building wall 2 may be provided with a sectioned gate or similar means. The wall opening 1 is further provided with the deformable sealing device according to the present invention which seals the gap between the edge of the wall opening 1 and the vehicle docking at the wall opening.

For this purpose, a deformable skirt is arranged spaced at a distance from the building wall 2. The skirt comprises an upper transverse portion 3 and two vertical strips 4 that are arranged in parallel to the two vertical sides of the wall opening 1. The upper transverse portion 3 and the two vertical strips 4 are comprised of a deformable pull-resistant material such as a fabric that has been treated or coated with plastic or rubber. The respective skirt is designed to adapt to the contour of vehicles docking at the sealing device.

The upper transverse portion 3 is suspended like a curtain with its upper edge from a transverse support 5 that may be made from steel or a similar material. A top cover 7 extends from the transverse support 5 to the building wall 2. The top cover 7 is attached to the building wall 2. The ends of the transverse support 5 rest loosely on the free ends of horizontal arms 6 that are connected to the building wall 2. Furthermore, the transverse support 5 is pivotable via backwardly extending guide rods about a horizontal axis that is located adjacent to the building wall 2. This arrangement allows for the pivoting of the transverse support 5 in the direction of the arrow a whereby the front portion of the top cover 7, the transverse support 5 and the upper transverse portion 3 carry out a lifting movement in order to allow tall vehicles to dock at the sealing device or allow lifting of container of vehicles that are already docked. Thereby a damage to the sealing device may be prevented.

The two vertical strips 4 which are arranged on both vertical sides of the wall opening 1 are arranged behind the upper transverse portion 3 and are connected to the free faces of the support bodies 10. The support bodies 10 are connected to the building wall 2 and are elastically deformable in the direction towards the building wall.

In order to provide a sufficient sealing at the upper and outwardly oriented corners of the sealing device the top cover 7 at its two ends in the longitudinal direction is provided with extensions 8 which are freely suspended and cover the upper end of the outwardly oriented portions of the support bodies 10. The extension 8 at its free end is formed into a loop 11 by doubling the material and securing the doubled layers in their position by a seam or gluing at a location 12. A rod 13, made from steel or a similar material, is introduced into the loop 11 in order to weight and stiffen the free end of the extension 8.

Due to this measure, the extension 8 remains in its position and maintains its shape even in harsh weather conditions. Furthermore, the transverse support 5 may still be moved in the direction of the arrow a and back to its initial position without warping or accidental jamming of the extension 8.

Preferably the extension 8 has a length that is greater than the lifting or pivoting distance.

The present invention is, of course, in no way restricted to the specific disclosure of the specification and drawings, but also encompasses any modifications within the scope of the appended claims.

What I claim is:

1. A deformable sealing device for a gap between a wall opening with vertical sides of a building wall and a back wall of a vehicle docking at the wall opening, said sealing device comprising a transverse support and a flappy deformable skirt comprising an upper transverse portion with an upper edge, said transverse portion being suspended with said upper edge from said transverse support, and two deformable vertical strips that are arranged parallel to said vertical sides of the wall opening, respective elastically deformable support bodies for supporting said vertical strips, and a top cover extending from said transverse support to the building wall, said top cover having extensions in a longitudinal direction thereof that are freely suspended from ends of said top cover and cover upper portions of said support bodies, wherein the improvement comprises:

said extensions being provided with a weight at a free end thereof;

said free end of said extensions having a loop for receiving said weight;

said transverse support together with said top cover, said upper transverse portion, and said extensions being liftable by pivoting about a horizontal axis that is located adjacent to the building wall; and guide rods that engage said transverse support for pivoting said transverse support.

2. A deformable sealing device according to claim 1, wherein said weight is a rod made of steel.

3. A deformable sealing device according to claim 1, wherein a length of said extensions is greater than a lifting distance.

4. A deformable sealing device according to claim 1, wherein a length of said extensions is greater than a pivoting distance.

* * * * *